United States Patent [19]

Wingard et al.

[11] Patent Number: 4,554,079
[45] Date of Patent: Nov. 19, 1985

[54] IMMISCIBLE LIQUID COLLECTOR AND METHOD OF OPERATION

[75] Inventors: Michael G. Wingard; John F. D. Peterson, both of Baton Rouge, La.

[73] Assignee: BASF Wyandotte Corporation, Wyandotte, Mich.

[21] Appl. No.: 548,327

[22] Filed: Nov. 3, 1983

[51] Int. Cl.⁴ .............................................. E02B 15/04
[52] U.S. Cl. .................... 210/776; 210/242.3; 210/923
[58] Field of Search ...................... 210/776, 241, 242.1, 210/242.3, 923, 294, 322, 806; 405/63–72; 114/38, 123, 125; 441/21, 28, 29

[56] References Cited

U.S. PATENT DOCUMENTS 3,221,884 12/1965 Muller .................................. 210/923
3,710,577 1/1973 Matheson ............................... 405/70
4,342,655 8/1982 Webb ................................. 210/242.1

FOREIGN PATENT DOCUMENTS 1314912 4/1973 United Kingdom .................. 405/68

Primary Examiner—David L. Lacey

Attorney, Agent, or Firm—Bernhard R. Swick

[57] ABSTRACT

The invention comprises a device and method for collecting floating immiscible liquids from flowing channels such as collection of oil from the surface of a water stream, such as an effluent stream from a factory by moving an inlet opening of the device in and out of the liquid. A preferred device employs a changing center of gravity to rotate the inlet opening and accomplish collection. With such a device a relatively large inlet opening may be employed whereby the lower edge of the opening may be adjusted just below the liquid surface in order to have only the desired portion of the surface flow into the device. The lower edge of the opening then moves up above the surface while the liquid which flowed into the device is being pumped out, thereby blocking the entrance of further liquid into the device and preventing further movement of the upper surface of the stream during pumping. Once the fluid is pumped out of the device the lower edge of the inlet opening repositions itself to the proper distance below the surface of the flowing stream for collecting another portion of the surface contaminants.

11 Claims, 6 Drawing Figures

IMMISCIBLE LIQUID COLLECTOR AND METHOD OF OPERATION

BACKGROUND OF THE INVENTION

1. Field of the Invention

The present invention relates to apparatus for removing floating or suspended material from the surface of a flowing stream of liquid. More particularly this invention relates to apparatus for removing oil and other immiscible liquid contaminants floating on water.

2. Presently Known Apparatus

U.S. Pat. Nos. 4,014,795; 4,207,191; 4,310,415; and 3,465,882 disclose apparatus for containing, collecting and skimming floating contaminants such as oil from the surface of a flowing stream of liquid. The patents illustrate the field of the present invention and collectively describe how skimming apparatus operates. The object of all such devices is to attempt to collect only the surface liquids, i.e., the contaminant liquids floating on the surface of the mainstream of a fluid, generally water. The closer one can come to collecting only the contaminant from the surface and minimizing the amount of water that is also collected, the lower the cost. One problem with prior art devices is that in order to avoid collecting large floating solid contaminants which might plug up the collecting devices, pumping means, etc., it has been necessary to employ devices whereby low collection velocities result and where the equipment is subject to plugging or fouling. Also, collection devices of the prior art are often complex and have moving parts and mechanical equipment located in or over the water.

Accordingly a purpose of the instant invention is to provide a skimming or contaminant collection device for collecting floating liquid contaminants from the surface of a flowing stream such as an effluent stream that is primarily water from a plant or factory. More particularly, it is a purpose of this invention to provide such device which is unaffected by floating debris and which collects the contaminants with a minimum amount of surface water without limiting the size of the collection opening unduly. Such size limitation limits apparatus capacity and presents plugging and fouling problems. It is also a purpose of the invention to provide such device which is simple to fabricate, has no mechanical equipment located in or over the water, and where there is ample flotation provided above the normal water line and where the water line may be easily adjusted.

SUMMARY OF THE INVENTION

In general terms the invention comprises a device to collect floating immiscible liquids from flowing channels such as collection of oil from the surface of a water stream, such as an effluent stream from a factory by moving an inlet opening of the device in and out of the liquid. In a preferred embodiment the device employs a changing center of gravity to rotate the inlet and accomplish collection. With such a device a relatively large inlet opening may be employed whereby the lower edge of the opening may be adjusted just below the liquid surface in order to have only the desired portion of the surface flow into the device. The lower edge of the opening then moves up above the surface while the liquid which flowed into the device is being pumped out, thereby blocking the entrance of further liquid into the device and preventing further movement of the upper surface of the stream during pumping. Once the fluid is pumped out of the device the lower edge of the inlet opening is repositioned to the proper distance below the surface of the flowing stream for collecting another portion of the surface contaminants.

Operation according to the invention involves floating a chamber in the stream, which chamber has an inlet opening and an outlet opening defined therein. The inlet opening has its lower boundary below the surface of the stream and the upper boundary above the surface of the stream. As the stream flows into the chamber it begins filling the chamber with liquid from the upper surface of the stream. The chamber then rotates whereby the inlet opening is rotated to a position with the lower boundary above the surface of the stream stopping liquid flow into the chamber. The liquid is then removed from the chamber, after which the chamber rotates back to its original position with the lower boundry of the inlet opening below the surface of the stream.

DESCRIPTION OF THE PREFERRED EMBODIMENT

Figure 3:
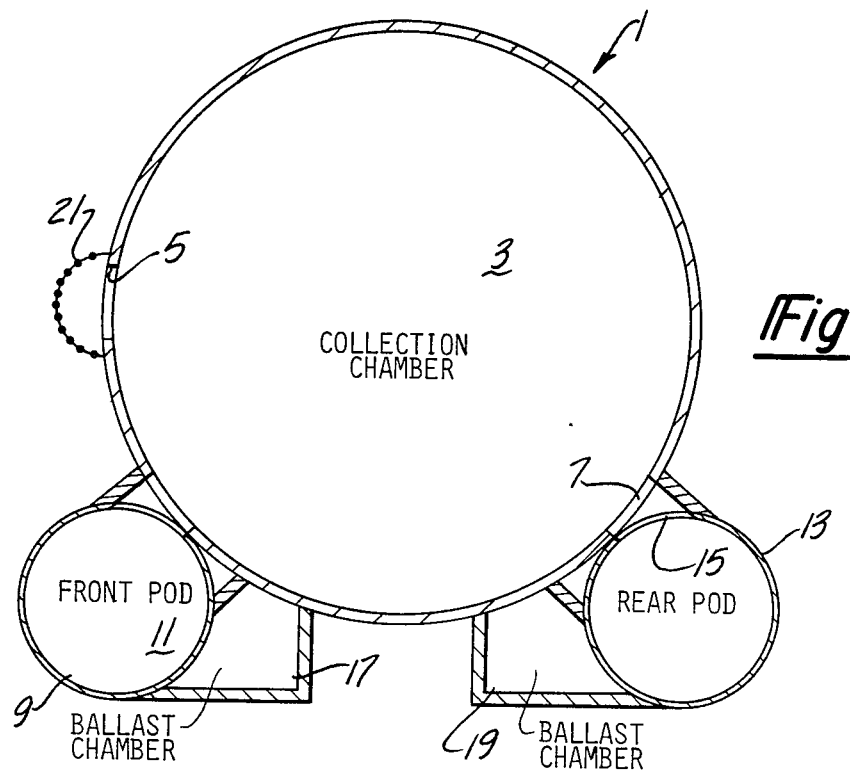
FIG. 3 is an elevational view in section of the skimming appartus embodying the principles of this invention.

With reference to the drawing, and more particularly FIG. 3 thereof, it will be seen that the skimming device embodying the principles of this invention comprises an elongated interceptor generally indicated at 1, having a chamber 3 defined therein provided with an inlet 5 and an outlet 7. The inlet 5 comprises a horizontal opening, preferably rectangular, and in general the outlet 7 would also comprise a horizontal rectangular opening. A first elongated pod 9 enclosing an air chamber 11 is provided which is joined to the interceptor 1 in side by side relatioship with the joint or connection below the inlet 5 and above the bottom of the interceptor 1.

A second elongated pod 13 is provided which is similarly joined to the interceptor in side by side relationship, adjacent the outlet 7. Said second pod 13 has an opening 15 defined therein which is in communication with the outlet 7. The outlet 7 and the opening 15 are preferably horizontal rectangular openings. The most convenient way of fabricating the apparatus is to employ a large pipe for the interceptor 1 and two smaller pipes, generally of the same diameter, for the two pods 9 and 13, said pipes being of suitable material such as steel, stainless steel, aluminum etc. depending upon the composition of the stream. By way of a nonlimiting example the interceptor 1 may be a 24" pipe while the pods may be 8" pipes.

In order to adjust the position of the skimming apparatus floating in the liquid stream, a ballast chamber is provided in the lower portion thereof, and preferably in order to adjust the position not only vertically but also rotationally, two ballast chambers are provided 17 and 19.

The apparatus of the instant invention employs a changing center of gravity to rotate the inlet 5 and outlet 7 alternately skimming and removing the liquid skimmed from the surface of the stream. In a most specific embodiment of the invention, the stream would be an effluent stream from a manufacturing facility which flows in a defined path, such as a canal, and the length of the skimming apparatus of the instant invention would extend from one bank of the stream to the other bank. Generally the base liquid or the principal liquid in the stream would be water and the contaminants would be oil or chemicals or other similar immiscible liquids which float on the surface of the water.

In order to prevent solids from entering the skimmer, a suitable screen 21 of suitable material such as conventional wire screening of steel or aluminum, cloth screening material, etc., is employed.

Figure 4:
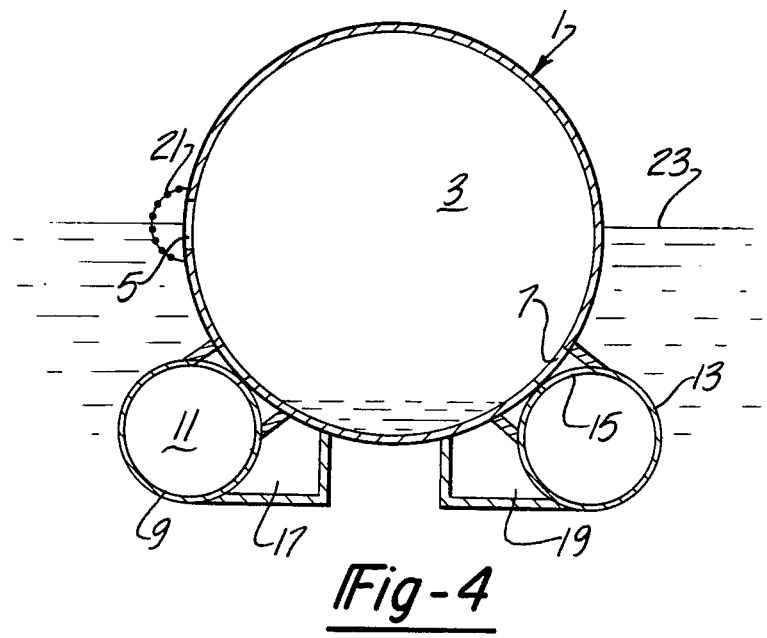
FIG. 4 is an elevational view in section of the skimming apparatus of FIG. 3 when floating in the stream of liquid in skimming position.
Figure 5:
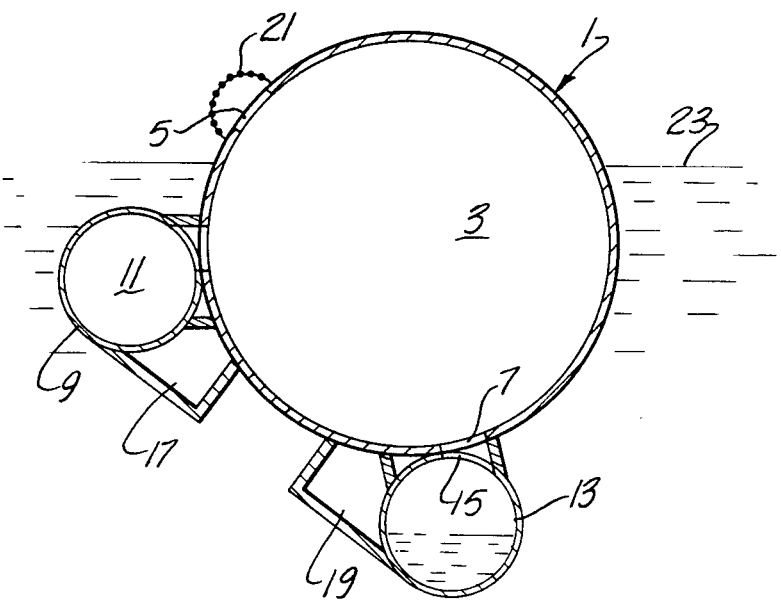
FIG. 5 is an elevational view in section of the skimming apparatus of FIG. 3 when floating in the liquid stream in the rotated position prior to removing the skimmed liquid.

With reference now more particularly to FIGS. 4 and 5 of the drawings, the operation of the skimming apparatus of the instant invention will be more clearly described. More specifically, the interceptor 1 inlet 5 outlet 7 pods 9 and 13 and ballast chambers 17 and 19 are so positioned relative to one another that when pod 13 is empty and the liquid in chamber 3 is below the lower edge of outlet 7, the apparatus floats in the stream 23 with the lower boundry of the inlet 5 below the surface of the stream 23 and the upper boundry above the surface of the stream 23 as shown in FIG. 4. As a non-limiting example where the interceptor 1 is a 24" pipe, the lower edge of inlet 5 may be 1" below the surface of the water and the upper edge 2" above the surface of the water. By having an opening of this size, the surface of the stream flows rapidly into the chamber 3 and at a much greater rate than achieved with conventional narrow openings.

The interceptor 1 remains in the position shown in FIG. 4 while liquid from the surface of the stream flows into the interceptor and collects on the bottom of chamber 3. When the level on the bottom of chamber 3 reaches the lower boundry of outlet 7, the liquid overflows into the second pod 13. As pod 13 fills, it tends to sink thereby rotating the interceptor whereby the lower boundry of inlet 5 is rotated to a position above the surface of stream 23 to the position illustrated in FIG. 5 of the drawing. This blocks the flow of liquid into the chamber 3 of the interceptor 1. The liquid in the pod 13 is removed from said pod through conduit 25 shown in FIGS. 1, 2 and 6 by suitable pumping means such as a self-priming pump 27. As the second pod empties, it becomes lighter whereby the interceptor apparatus rotates counterclockwise back to the position shown in FIG. 4. The first pod 9 is completely closed, contains air or other gas, and thus maintains the same degree of bouyancy throughout and serves as equivalent of a counterweight. Thus, filling of the second pod 13 by overflow from chamber 3 will rotate the apparatus clockwise and emptying the second pod 13 by the pumping means 27 thereby increasing its bouyancy will rotate the apparatus counterclockwise. Thus it is clear that the apparatus employs a changing center of gravity to accomplish rotation of the inlet 5 out of the stream for discharge of the collected fluid and back into the stream for collection of the fluid.

Figure 6:
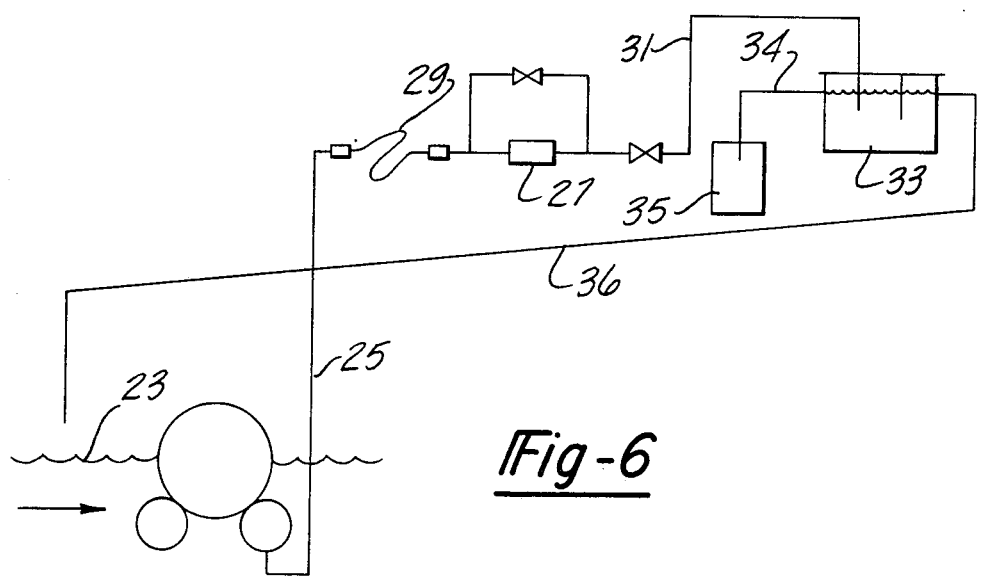
FIG. 6 is a diagramatic view of a system for removing the collected liquid from the skimming apparatus, separating the floating contaminants from the base liquid and returning the base liquid to the stream.

The skimmed liquid from the second pod 13 is subjected to a separation process, as illustrated in FIG. 6. Referring more particularly to FIG. 6, the liquid from the second pod 13 flows through conduit 25, a flexible conduit 29 provided in order to permit vertical and rotational movement of the skimming apparatus, self-priming pump 27, an additional conduit 31 into a separator 33 where the oil or other contaminants are separated and sent through conduit 34 to a storage tank 35. The water or cleaned liquid resulting from the separation is then returned to the stream 23 on the upstream side of the skimming apparatus through conduit 36.

The vertical positioning of the skimming apparatus in the stream 23 may be accomplished through the use of at least one ballast chamber, and preferably two ballast chambers 17 and 19, as shown in the drawings. The position of the skimming apparatus may be lowered to a greater depth in the stream by injecting ballast fluid such as water into each ballast chamber in equal amounts through the front and rear ballast supply and drain conduits 37 and 39 by suitable means such as pumping means (not shown). The air present in the ballast tanks is forced out through the vents 41 and 43. Where it is desired to raise the skimming apparatus vertically, the ballast fluid may be pumped or pressured out of these ballast chambers 17 and 19 by use of suitable means such as pumps or compressed air (not shown). A double acting pump such as a piston pump with a suitable conventional valving arrangement may be used for both pumping ballast into the ballast tanks 17 and 19 and for removing ballast from the ballast tanks. Alternatively, separate pumps may be employed, one for supplying fluid to the ballast tanks and one for removing the fluid.

The rotational position of the skimming apparatus may also be controlled by means of the ballast tanks. For example, injecting fluid in the front ballast chamber 17 only, with or without removal of ballast fluid from the rear ballast chamber 19, will rotate the apparatus in a counter-clockwise direction. Conversely, pumping fluid into the rear ballast chamber 19, with or without removal of ballast from the front ballast chamber 17, will rotate the apparatus in a clockwise direction.

Figure 1:
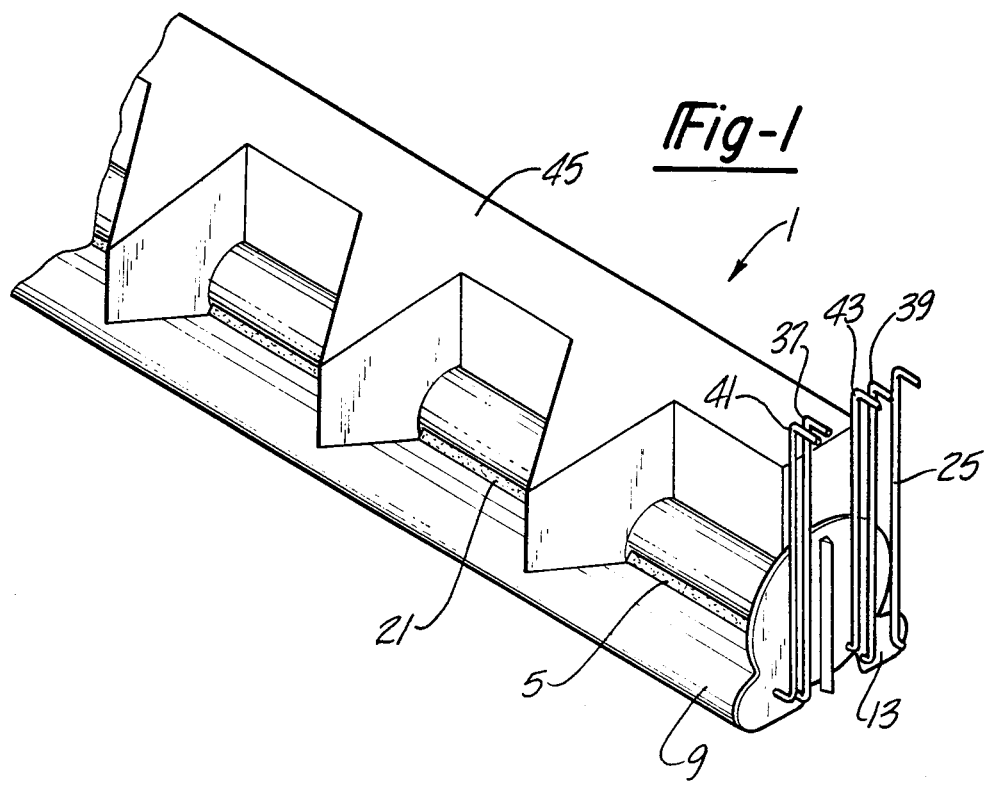
FIG. 1 is a diagramatic three-dimensional view of a presently preferred skimming apparatus embodying the principles of this invention and illustrating the use of a foam float with the apparatus.
Figure 2:
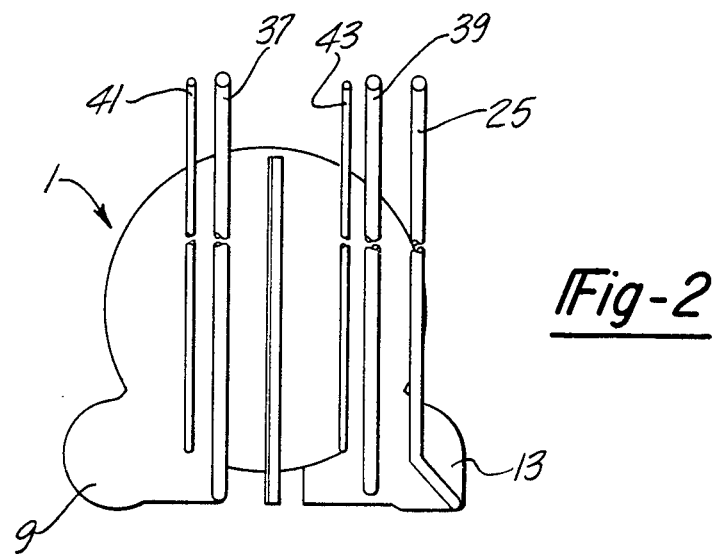
FIG. 2 is an end elevational view of the skimming apparatus embodying the principles of this invention.

In order to provide for greatly increased bouyancy, a float of bouyant material such as a closed cell plastic foam 45, i.e., polyurethane or polystyrene foam, may be affixed to the upper portion of interceptor 1, as shown in FIG. 1, by suitable means. For example, it could be a preformed float of a shape such as shown in FIG. 1 of the drawing which is attached to the interceptor by suitable means such as an adhesive. Alternatively, the plastic could be foamed in place by the use of an appropriate mold properly positioned around the apparatus of the invention, particularly the interceptor 1. To hold such foam in place, suitable anchor bolts (not shown) could be attached which project out from the surface of the interceptor 1 to hold the float in place. While highly useful, float 45 may not always be essential and, accordingly, it is illustrated only in FIG. 1.

It is to be understood that various changes and modifications may be made in the foregoing apparatus without departing from the spirit of the invention and scope of the appended claims, wherein:

What is claimed is:

1. An apparatus for removing floating and suspended immiscible liquids from a flowing stream comprising an elongated interceptor having a chamber defined therein, provided with an upper inlet and a lower outlet, a plurality of additional elongated structures having chambers defined therein comprising: a first pod enclosing an air chamber joined to said interceptor in side by side relationship below said inlet, a second pod joined to said interceptor in side by side relationship adjacent said outlet, and having an opening defined therein in communication with said outlet; the interceptor inlet, outlet, and pods being so positioned relative to one another that when in skimming position said apparatus floats in said stream with the lower boundary of said inlet below the surface of said stream, and the upper boundary, of said inlet being above the surface of said stream, with said interceptor remaining in said position while liquid from the surface of said stream flows into said interceptor through said inlet into said chamber and whereby when the liquid level in said chamber reaches the level of the lower boundary of said outlet, said liquid flows into said second pod which sinks to a lower level as it fills, thereby rotating said interceptor whereby said lower boundary of said inlet is rotated to a position above the surface of said stream thereby stopping liquid flow into said interceptor, intermittantly operable means for removing said liquid from said second pod, said intermittantly operable means being operative only upon rotation of the interceptor to a position where the lower boundary of said inlet is above the surface of said stream whereby said pod and said interceptor return to their original positions with the lower boundary of said inlet below the surface of said stream and the upper boundary of said inlet above the surface of said stream and wherein all said additional structures having chambers defined therein are below the surface of said stream.

2. The apparatus of claim 1 wherein said additional elongated structures include at least one ballast chamber positioned and arranged so as to control the vertical position of said apparatus relative to the surface of said flowing stream and means for supplying and withdrawing ballast liquid into and out of said at least one ballast chamber, whereby said apparatus is moved vertically relative to the surface of said stream.

3. The apparatus of claim 2 wherein said apparatus includes float means other than structures having chambers defined therein affixed thereto.

4. The apparatus of claim 2 wherein said additional elongated structures include two separate ballast means, each being provided with separate means for supplying and withdrawing ballast fluid to said ballast means, whereby the vertical positions of each ballast means may be independently controlled, thus effectively controlling rotational position of said apparatus as well as the vertical position of said aparatus.

5. The apparatus of claim 4 wherein said apparatus includes float means other than structures having chambers defined therein affixed thereto.

6. The apparatus of claim 4 including means for separating said immiscible liquids comprising a pumping means for removing the skimmed liquid from said second pod through conduit means to a separator, conduit means for conducting the immiscible liquid from said separator to a storage tank and for returning cleaned liquid to said stream at a location upstream of said apparatus.

7. The apparatus of claim 6 wherein said apparatus includes float means other than structures having chambers defined therein affixed thereto.

8. The apparatus of claim 2 including means for separating said immicible liquids comprising a pumping means for removing the skimmed liquid from said second pod through conduit means to a separator, conduit means for conducting the immiscible liquid from said separator means to a storage tank and for returning cleaned liquid to said stream at a location upstream of said apparatus.

9. The apparatus of claim 8 wherein said apparatus includes float means other than structures having chambers defined therein affixed thereto.

10. A method for removing floating and suspended immiscible liquids from a flowing stream of liquid comprising the steps of (a) floating an apparatus in said stream comprising a first chamber having upper inlet and lower outlet openings each of which has a lower and upper boundary and having a second air chamber which is a closed chamber in side-by-side relationship with said first chamber and joined thereto, and a third chamber also in side-by-side relationship adjacent said first chamber and joined thereto adjacent said outlet opening and having an opening defined therein in communication with said outlet, said inlet opening of said first chamber having its lower boundary below the surface of said stream and the upper boundary of said inlet being above the surface of said stream whereby liquid from said stream flows into said first chamber through said inlet eventually filling said chamber to the level of the lower boundary of said outlet whereby said liquid flows into said third chamber which sinks to a lower level as it fills thereby rotating said first chamber whereby said lower boundary of said inlet is rotated to a position above the surface of said stream thereby stopping liquid flow into said first chamber, and (b) removing said liquid from said third chamber whereby said first and third chambers return to their original positions with the lower boundary of said inlet below the surface of said stream and the upper boundary above the surface of said stream.

11. The method of claims 10 including the steps of separating said immiscible liquid from the liquid skimmed from the surface of said stream and returnig the cleaned liquid to said stream at a location upstream of said apparatus.

* * * * *